United States Patent [19]
Amundsen et al.

[11] Patent Number: 6,006,995
[45] Date of Patent: Dec. 28, 1999

[54] SYSTEM FOR READING BAR CODE SYMBOL ON CONTAINERS HAVING ARBITRARY SURFACE GEOMETRY

[75] Inventors: Thomas A. Amundsen, Turnersville, N.J.; Andreas Nordbryhn, Asker, Norway

[73] Assignee: Metrologic Instruments Inc., Blackwood, N.J.

[21] Appl. No.: 08/814,159

[22] Filed: Mar. 10, 1997

Related U.S. Application Data

[63] Continuation of application No. 08/662,856, Jun. 12, 1996, abandoned, which is a continuation of application No. 08/532,262, Sep. 22, 1995, abandoned, which is a continuation of application No. 08/383,606, Feb. 2, 1995, abandoned, which is a continuation of application No. 08/135,087, Oct. 12, 1993, abandoned.

[51] Int. Cl.$^6$ ..................................................... G06K 7/10
[52] U.S. Cl. ........................................... 235/467; 235/464
[58] Field of Search ....................................... 235/467, 464

[56] References Cited

U.S. PATENT DOCUMENTS

| | | | |
|---|---|---|---|
| 4,250,405 | 2/1981 | Ashcroft et al. | 235/464 |
| 4,333,005 | 6/1982 | Takamatsu | 235/464 |
| 4,449,042 | 5/1984 | Hampson | 235/464 |
| 4,622,457 | 11/1986 | Bradley et al. | 235/464 |
| 4,816,668 | 3/1989 | Williams et al. | 235/464 |
| 4,847,474 | 7/1989 | Engel | 235/464 |
| 4,861,973 | 8/1989 | Hellefson | 235/467 |
| 5,103,081 | 4/1992 | Fisher et al. | 235/464 |
| 5,175,421 | 12/1992 | Harris | 235/467 |
| 5,216,232 | 6/1993 | Knowles et al. | 235/467 |

*Primary Examiner*—Harold Pitts
*Attorney, Agent, or Firm*—Hopgood, Calimafde, Kalil & Judlowe, LLP

[57] ABSTRACT

A bar code symbol reading system for reading bar code symbols disposed on rotating containers, such as cans and bottles, which have various capacities and arbitrary surfaces upon which the bar code symbols are printed. The system includes a laser scanning engine which produces a three-dimensional laser scanning pattern having unique geometrical characteristics over a predefined scanning region, within which each container is rotated. Owing to its unique geometry, the laser scanning pattern facilitates reading of bar code symbols printed on arbitrary container surfaces while rotated within the predefined scanning region. As a result of the present invention, a single bar code symbol reading system can be used to read bar code symbols that are printed on the arbitrary surfaces of cans and bottles.

7 Claims, 11 Drawing Sheets

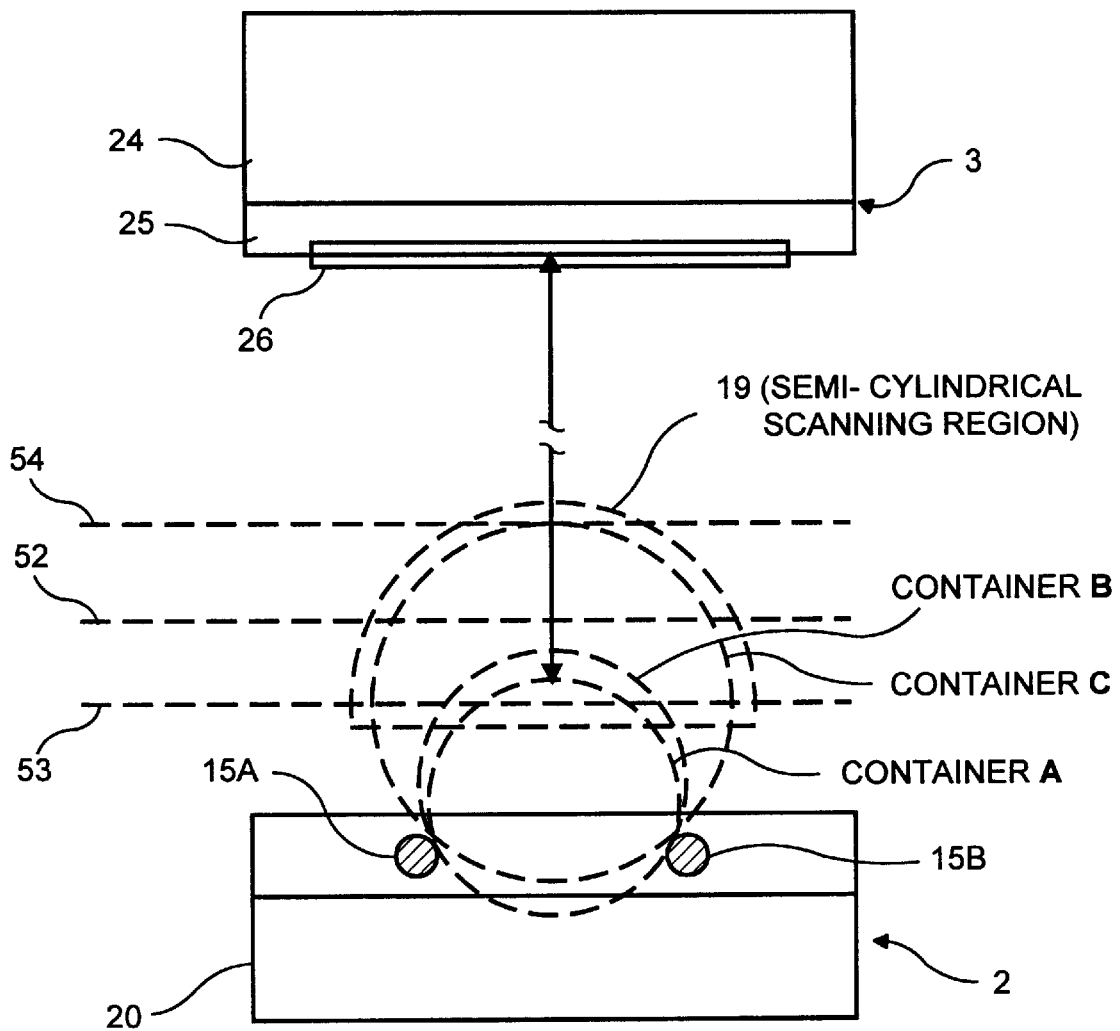
F I G. 2

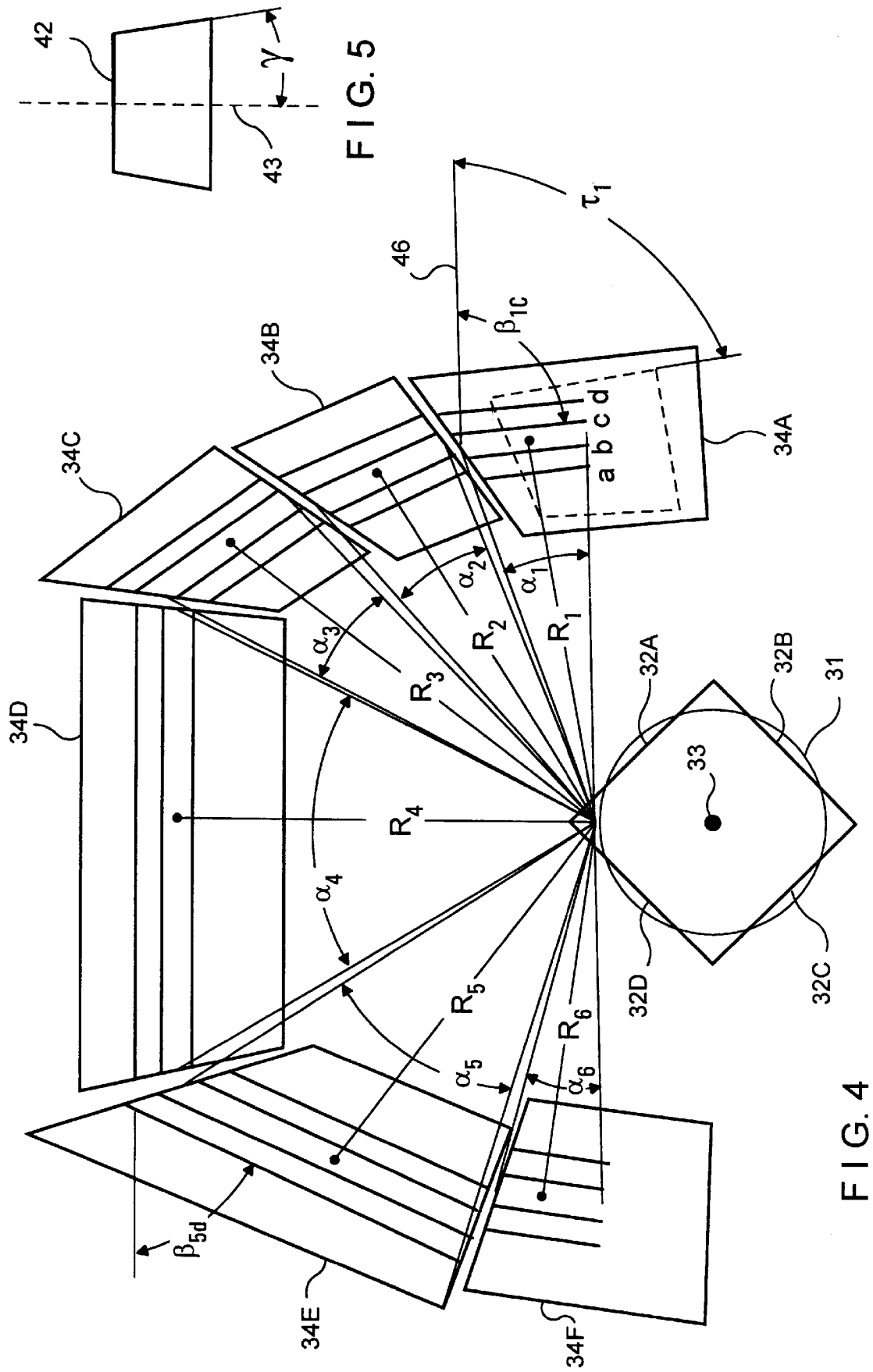

τ = TWIST ANGLE OF MIRROR BRACKET
t = TILT ANGLE OF MIRROR BRACKET

| $\delta_i$ | i | $R_i$ | $\beta_i$ | $\alpha_i$ | $\tau_i$ | $t_i$ |
|---|---|---|---|---|---|---|
|  | 1 | 2.66" | 83.3° | 17° | 81° | 46.5° |
|  | 2 | 3.01" | 63.6° | 22.5° | 63.5° | 48.5° |
|  | 3 | 3.45" | 46.3° | 22° | 46.5° | 50.5° |
|  | 4 | 3.30" | 0° | 49° | 0° | 44° |
|  | 5 | 3.26" | 64.1° | 31.5° | 65° | 51.5° |
|  | 6 | 2.66" | 81.1° | 17.8° | 79° | 49.5° |

FIG. 6

| $\beta_{1a}$ = 82.5 | $\beta_{1b}$ = 82.5 | $\beta_{1c}$ = 84 | $\beta_{1d}$ = 84 |
|---|---|---|---|
| $\beta_{2a}$ = 62.75 | $\beta_{2b}$ = 63 | $\beta_{2c}$ = 64.25 | $\beta_{2d}$ = 64.25 |
| $\beta_{3a}$ = 45 | $\beta_{3b}$ = 45 | $\beta_{3c}$ = 47.5 | $\beta_{3d}$ = 47.25 |
| $\beta_{4a}$ = 0 | $\beta_{4b}$ = 0 | $\beta_{4c}$ = 0 | $\beta_{4d}$ = 0 |
| $\beta_{5a}$ = 62.25 | $\beta_{5b}$ = 63.75 | $\beta_{5c}$ = 64.5 | $\beta_{5d}$ = 66 |
| $\beta_{6a}$ = 80 | $\beta_{6b}$ = 81 | $\beta_{6c}$ = 81.25 | $\beta_{6d}$ = 82.25 |

FIG. 7

SYSTEM FOR READING BAR CODE SYMBOL ON CONTAINERS HAVING ARBITRARY SURFACE GEOMETRY

RELATED CASES

This is a continuation of application Ser. No. 08/662,856 filed on Jun. 12, 1996 now abandoned which is a continuation of Ser. No. 08/532,262 filed on Sep. 22, 1995 now abandoned; which is a continuation of application Ser. No. 08/383,606 filed on Feb. 2, 1995 now abandoned; which is a continuation of application Ser. No. 08/135,087 filed Oct. 12, 1993 now abandoned.

BACKGROUND OF THE INVENTION

1. Field of the Invention

The present invention relates to a machine capable of reliably collecting recyclable containers, such glass bottles, metal cans, and plastic bottles, bearing bar code symbols on arbitrary surfaces, and also to a method of collecting such diverse types of recyclable containers using a single machine.

2. Brief Description of the Prior Art

In recent times, most members of our society have become aware of the need to recycle the materials used in the manufacture of household and industrial products. Based on this general awareness, markets for recycled materials such as metal, glass, and plastic, have been created.

As part of this trend in recycling, various types of "reverse vending" machines have been developed on order to facilitate the collection of such types of recyclable materials. Presently, reverse vending machines for collecting metal cans, glass bottles, and plastic bottles for recycling have enjoyed less than great popularity among consumers. On reason for this consumer response is based on the fact that glass bottles, metal cans, and plastic bottles have had to be placed in the scanning bins (i.e., receiving slots) of different machines. In order to read the bar code symbol printed on such containers, each of these machines is equipped with a bar code symbol reader having a laser scanning pattern particularly designed to read bar code symbols on surfaces of particular geometry and at different locations along the rotatable scanning bin in which the container is rotated about its axis during laser scanning. Upon successfully reading the bar code symbol on each laser scanned container, the coin deposit paid on the container or voucher representative thereof is automatically dispensed to the consumer. Presently, a number of reverse vending machines of the type described above have been developed and sold by TOMRA, of Asker, Norway and ENVIPCO, of Fairfax, Va.

While prior art container collection machines of the type described above have been influential in advancing the trend of container recycling in our society, such machines have nevertheless suffered from a number of shortcomings and drawbacks.

In particular, due to inherent limitations of prior art laser bar code scanning equipment, such container collection machines have been designed to read bar code symbols on single types of containers, e.g., metal cans, glass bottles, plastic bottles, etc. Thus, in order to recycle containers, the consumers have had to first segregate them according to container type. Then to return a metal can for recycling, the consumer has had to insert the can into the scanning bin of a collection machine particularly designed to read bar codes located on the cylindrical surface of the can as the can and bar code are rotated about the lower region of the scanning bin. To return a glass bottle for recycling, the consumer has had to insert the glass bottle into the scanning bin of a collection machine particularly designed to read bar codes located on the conical or cylindrical surface of the bottle as the bottle and bar code symbol are rotated about another region of the scanning bin. Similarly, to return a plastic bottle (e.g., 1 or 2 liter size) for recycling, the consumer has had to insert the plastic bottle into the scanning bin of a collection machine particularly designed to rear bar codes located on the cylindrical surface of the bottle as the bottle and bar code symbol are rotated about yet another region of the scanning bin.

As a result of the above-described recycling protocol, additional time has been required to carry out recyclable container collection operations, and therefore, many consumers have been less than enthusiastic in participating in recyclable container collection efforts.

Thus, there is a great need in the art for a container collection machine which is not limited by the shortcomings and drawbacks of prior art machinery and processor.

OBJECTS AND SUMMARY OF THE PRESENT INVENTION

Accordingly, it is a primary object of the present invention to provide a recyclable container collection machine that is capable of reading various types of bar code symbols located on arbitrary surfaces of metal cans, glass bottles, and plastic bottles alike, while avoiding the shortcomings and drawbacks of prior art machinery.

A further object of the present invention is to provide such a container collection machine in which a three-dimensional laser scanning pattern is generated and projected over a predefined portion of the container support platform so that a bar code symbol printed on an arbitrary container surface can be reliably read in order to identify the recyclable container.

A further object of the present invention is to provide such a novel method of collecting recyclable glass bottles, metal cans, and plastic bottles of various sizes, using a single machine.

An even further object of the present invention is to provide such a method of a recyclable container collection using a three-dimensional laser scanning pattern having unique geometrical characteristics which facilitate the reading of bar code symbols printed on container surfaces of arbitrary geometry.

A further object of the present invention is to provide an improved bar code symbol reading device capable of generating such a laser scanning pattern within the region adjacent the container support platform of a recyclable container collection machine.

These and other objects will become apparent hereinafter and in the claims to invention.

BRIEF DESCRIPTION OF THE DRAWINGS

For a further understanding of the objects of the Present Invention, the Detailed Description of the Illustrative Embodiment: is to be read in conjunction with the attached drawings in which:

FIG. 2 is an elevated side view of the container support platform and the laser-based bar code scanning unit mounted within the machine of the present invention, taken along line 2—2 of FIG. 1;

FIG. 4 is a schematic representation illustrating the spatial relationship among the array of stationary mirrors and the array of rotating mirrors mounted upon the optical bench of the bar code symbol scanning unit within the machine of the present invention;

FIG. 5 is a schematic representation illustrating the angles at which each of the array of rotating mirrors are mounted relative to the rotational axis of the electrical motor which rotates the same;

FIGS. 6 and 7 are tables containing physical parameters used to construct and arrange the optical components upon the optical platform of the bar code reading unit within the machine of the present invention;

DETAILED DESCRIPTION OF THE ILLUSTRATIVE EMBODIMENT

Figure 1:
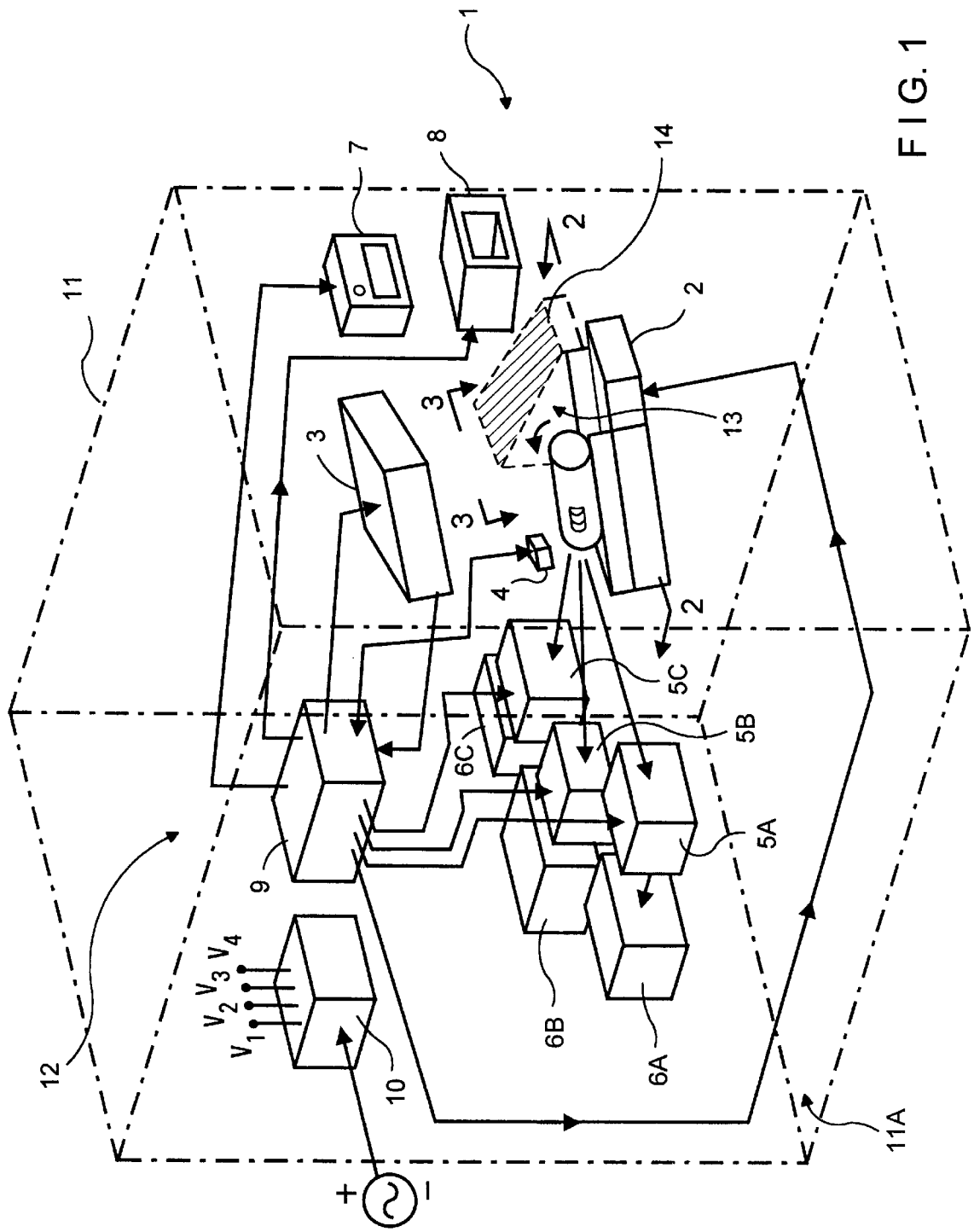
FIG. 1 is a perspective block functional diagram of the recyclable container collection machine of the present invention.

Referring now to various figures of the drawings in which like reference characters refer to like parts, an illustrative embodiment of the present invention will be described in detail.

In FIG. 1, the recyclable container collection machine of the present invention is schematically represented. As will become apparent hereinafter, this "reverse vending" machine is particularly designed to be capable of collecting, substantially different types of recyclable containers such as metal cans having 12 oz., 16 oz., or 32 oz. capacity, glass bottles having 12 oz., 16 oz., or 32 oz. capacity, and plastic bottles having one or two liter capacity by itself and without recalibration. In general, each of these different type containers is made from a recyclable material and has a longitudinal axis about which an axially symmetric surface extends. Within the scope and spirit of the present invention, the surface geometry of each recyclable container collectable by the machine hereof may be truly arbitrary, which hitherto has been impossible when using prior art machinery and processes.

As shown in FIG. 1, the machine of the present invention comprises an assembly of components, namely: a container support platform 2; a laser-based bar code symbol reading unit 3; a container detection unit 4; a plurality of container compacting devices 5A, 5B, and 5C; a plurality of container collection bins 6A, 6B, and 6C; a user interface unit 7; a deposit dispensing unit 8; a system controller and computer (hereinafter "system computer") 9; and an electrical power supply 10. In the preferred embodiment, all of these components are contained within a rugged housing generally indicated by reference numeral 11. The structural and functional characteristics of each of these components will be described in detail below.

As illustrated, machine housing 11 has a support base 11A, an interior 12, and an opening 13 through which each recyclable container can be passed to the housing interior by simply lifting up a hinged door 14 and inserting the container through the opening. The container support platform 2 is mounted within the housing at an inclined angle (e.g., about 10 degrees) with respect to the housing base by support bracketing (not shown). The container support platform has a pair of rotatable spindles (i.e., shafts) 15A and 15B, whose center axes are parallelly spaced apart by about 2.375 inches. These spindles are supported by bushings (e.g., bearings) mounted in holes 16A and 16B formed in support brackets 17 and 18. The function of these spindles is to support a recyclable container within a substantially semi-cylindrical container scanning region 19, while disposed at angle $\alpha$ with respect to the housing base. The pair of container support spindles are operable connected to an electric motor 20, through gearing, in order to cause these spindles to turn and thus rotate the supported container about its longitudinal axis. Typically, the angular velocity of these support spindles is controlled by a motor control circuit (not shown), which is activated by the system computer in response to a second control activation signal $A_2$ produced by container detection unit 3. Typically, the rate of rotation of the container is controllably maintained in the range of about 140 to about 160 rpm's.

As illustrated in FIG. 1, bar code symbol reading unit 3 is mounted within machine housing 11 so that it is positioned about 15 or so inches away from the container support platform 2. A major function of the bar code symbol reading unit is to produce, sweep, and project a visible laser beam in order to generate a three-dimensional laser scanning pattern within a substantially semi-cylindrical "container scanning region" 19, schematically defined in FIGS. 2 and 3, in particular. As the container is rotated about its longitudinal axis, the produced laser beam is repeatedly scanned across the bar code symbol (22A, 22B, 22C) on the rotating container and at least a portion of the laser light reflected from the scanned bar code symbol is focused and detected to produce an electrical signal indicative of the detected light intensity. The electrical signal is automatically processed using signal processing circuitry 23 disposed within in the compact housing of the bar code symbol reading unit so as to decode the scanned bar code symbol and produce symbol character data representative of the decoded bar code symbol. Thereafter, the system computer determines whether the decoded bar code symbol identifies a recyclable container for which a coin deposit is to be refunded to the user. If so, deposit dispensing unit 8 dispenses the deposit paid on recyclable container (or voucher) in one of two ways: either (i) in automatic response to the reading of a "valid" bar code symbol on the rotated container and the compacting and collection of the container within the housing, or (ii) in automatic response to the reading of a "valid" bar code symbol on the rotated container, the compacting and collection of the container within the housing, and the manual depression of a "deposit return" button on the control panel of the user interface unit.

Typically, the machine will include at least one compacting device, the function of which is to receive the recyclable container from the container supporting platform and compact the physical dimensions thereof by the application of controlled force (e.g., by a mechanically-operated mechanism) well known in the art. In the illustrative embodiment, a different type of compacting device is provided for each of the three different types of containers that may be collected by the machine. These compacting devices are designated by reference characters 5A, 5B, and 5C. Each of these compacting devices is particularly adapted to the structural characteristics of a particular type of container (i.e., metal cans, glass bottles, and plastic bottles. In some applications, glass bottles are to be collected, cleaned and reused; and thus, it is not desired to compact the physical dimensions of such containers, as by breaking or crushing. Thus, only two compacting devices will be required, i.e., one for metal cans and one for plastic bottles.

After performing container compacting operations, it is necessary for the machine to collect the compacted (or non-compacted) container bearing valid bar code symbols. In the illustrative embodiment, such container collection operations are carried out using three container collection bins 6A, 6B, and 6C, one for crushed metal cans, one for crushed or uncrushed glass bottles, and one for shreaded or cut-up plastic bottles, respectively. In general, these bins can be realized in a number of different ways using, for example, large open-top containers, or recloseable plastic bags supported within the machine housing and accessible by hinged doors (not shown). The design of such bins should facilitate the transport of collected containers to recycling centers or other destinations at which the container will eventually be reused.

One function of the system computer is to control the operation of the motorized container support platform z, the bar code symbol reading unit 3, the compacting devices 5A, 5B, and 5C, user interface unit 7, and deposit dispensing unit 8. Another function of the system computer is to perform various computations required during the automatic container identification process. In the illustrative embodiment, the system computer is activated upon the production of a first control activation signal from container detection unit 4. In the illustrative embodiment, the container detection unit is realized by an infrared photo-diode, photo-transistor, and suitable electronic circuitry configured together in a manner well known in the art. Greater details of system computer functions will be described hereinafter.

Figure 8:
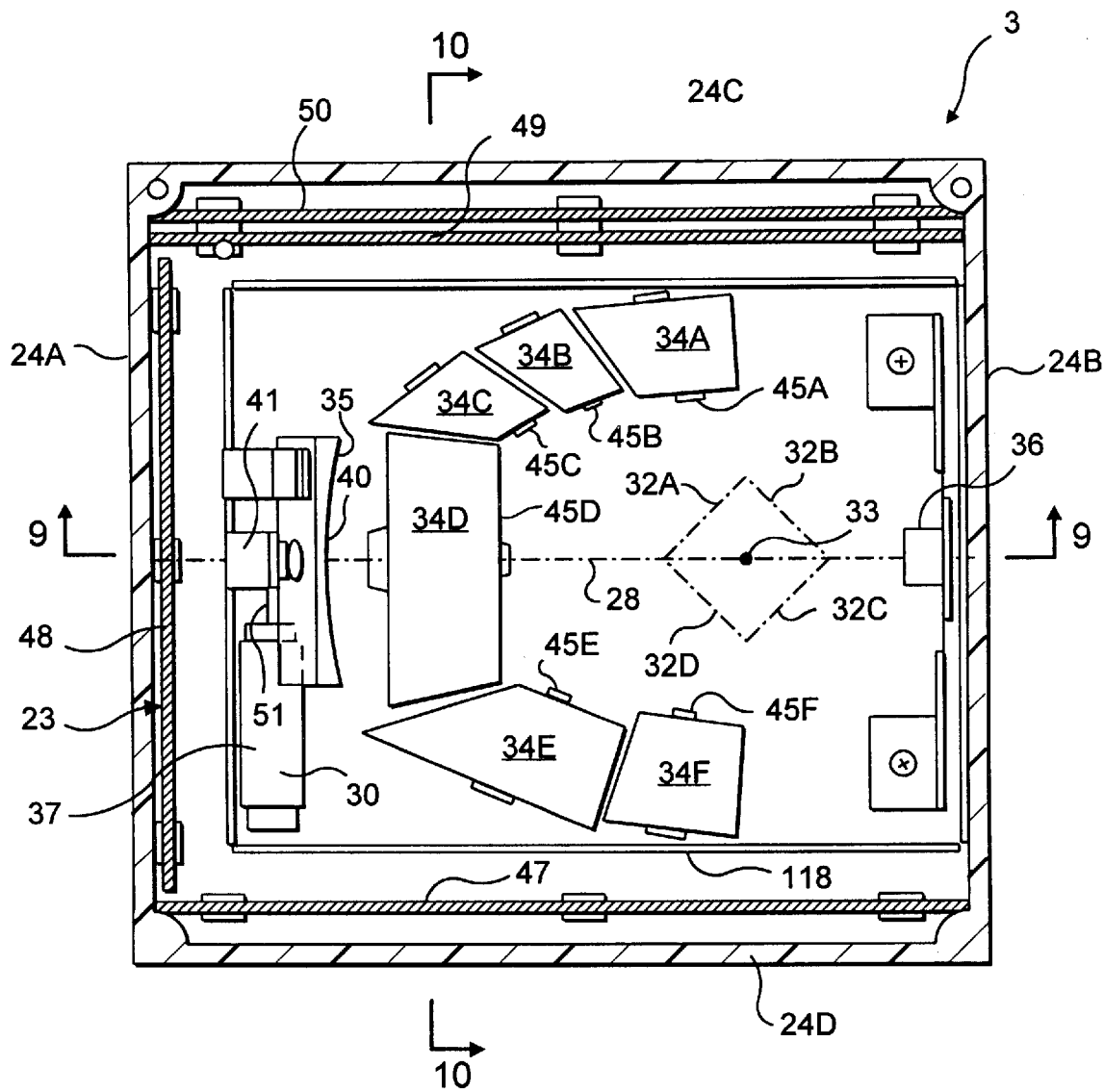
FIG. 8 is a cross-sectional view of the bar code reading unit, showing the optical layout thereof.
Figure 9:
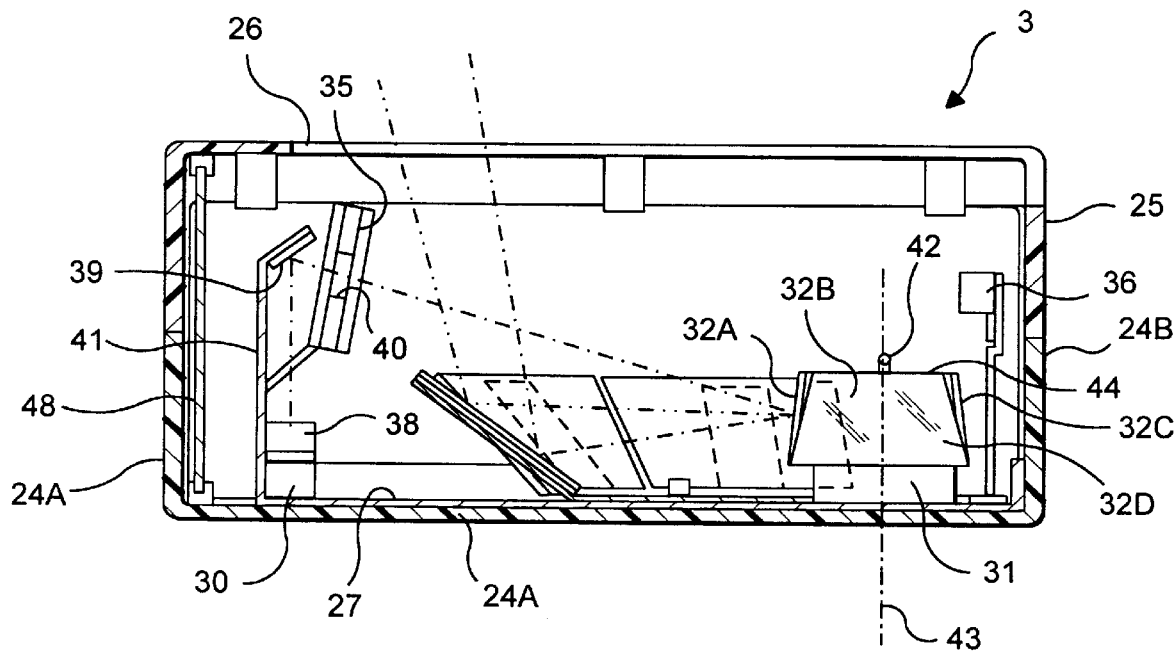
FIG. 9 is a cross-sectional view of the bar code symbol reading unit taken along line 9—9 of FIG. 8.
Figure 10:
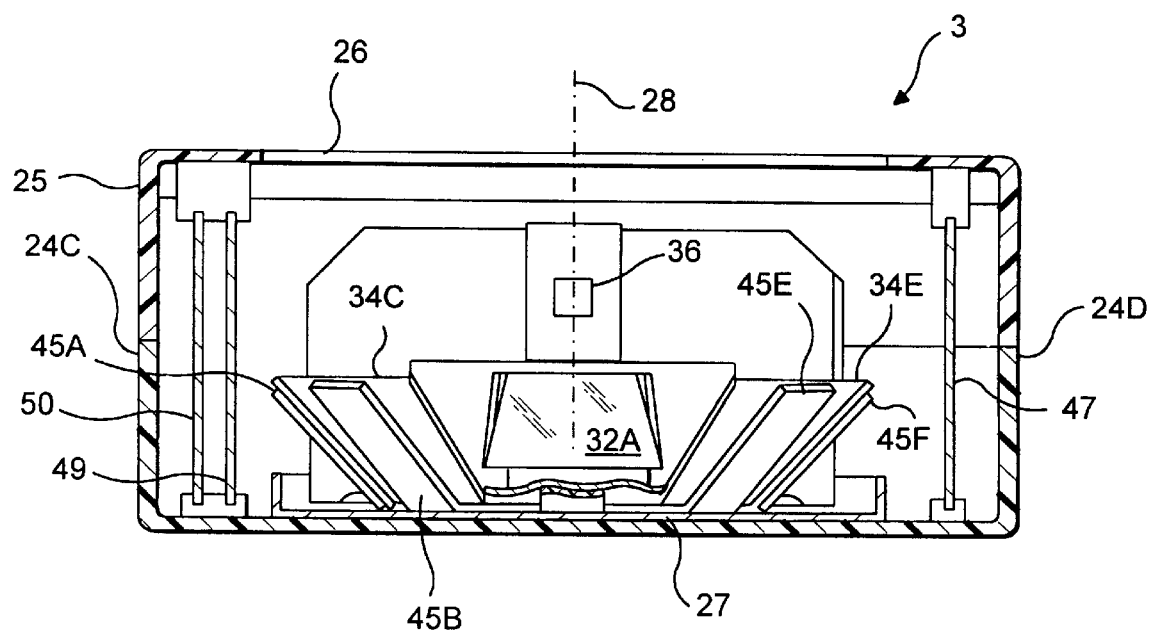
FIG. 10 is a cross-sectional view of the bar code symbol reading unit taken along line 10—10 of FIG. 8.

As best illustrated in FIGS. 8, 9, and 10, the bar code symbol reading unit includes a compact housing comprising a bottom housing portion 24 and top housing portion 25. As shown, the bottom housing portion has a bottom wall 24A and two pairs of opposing side walls 24A, 24B, 24C, 24D. Through the front wall of the first housing portion, optically transparent planar window 26 is mounted through an aperture formed in front wall. The geometry of this window is generally rectangular in shape, although it may be different in alternative embodiments. Preferably these housing portions are formed from metal, and when joined together along their peripheral edges, from the compact housing. These housing sections can be fastened together using threaded screws in a conventional manner.

Mounted on the bottom wall of the compact housing is an optical bench 27. In the illustrative embodiment of the optical bench is substantially planar, although it is understood that it may have a multi-level or non-planar design without departing from the present invention. As illustrated in FIG. 8, all of the optical and electro-optical components of the bar code symbol reading unit are securely mounted with respect to a central longitudinal plane 28, extending centrally along the longitudinal axis of the optical bench. As can be best seen in FIGS. 8, 9, and 10, such optical and electro-optical components include a solid state laser diode 30 driven by laser diode driving circuitry (not shown); an electric motor 31 driven by an electric motor driving circuitry (not shown), an array of rotatable planar mirrors 32A, 32B, 32C, and 32D rotably mounted on the shaft 33 of the electric motor; an array of stationary planar mirrors 34A, 34B, 34C, 34D, 34E, and 34F, mounted about the array of rotating mirrors; a laser light focusing mirror 35 for focusing received laser light reflected off a scanned bar code symbol; and a photo-detector 36 for detecting the intensity of laser light focused by the light focusing mirror 35 and producing an electrical signal indicative of the intensity of the detected laser light.

As shown, the laser diode 30 is mounted on the optical bench by bracket 37. The laser beam produced from the laser diode is directed to the array of rotating mirrors 32A, 32B, 32C, and 32D, after being reflected off routing mirrors 38 and 39, and passing through an aperture 40 formed in laser light focusing mirror 35.

As best illustrated in FIG. 9, electric motor 31 has a shaft 42 which is rotatable about a first axis 43. In the illustrative embodiment, the array of planar mirrors 42A, 42B, 42C, and 42D are fixedly mounted at acute angles ($\gamma$) 5.75, 8.75, 2.75, and 11.75 degrees measured with respect to the rotatable shaft. As shown, such mounting is achieved using a polygonally shaped support structure 44 mounted to the shaft of electrical motor 31. These planar mirrors are rotatable about the first axis when the electric motor is energized with power from power supply 10 under the control of system computer 9. The array of mirrors, i.e., first, second, third, fourth, fifth, and sixth planar mirrors 34A, 34B, 34C, 34D, 34E, and 34F, are mounted upon the optical bench by way of a mirror mounting bracket assembly having individual mirror support structures 45A, 45B, 45C, 45D, 45E, and 45F, respectively. These mirror mounting brackets can be fixed to the optical bench by way of welding, adhesive, or other suitable mounting techniques known in the art.

It is believed that there may be more than one possible optical layout capable of realizing the three-dimensional laser scanning pattern of the present invention. However, the best optical layout presently known to applicants and capable of achieving the objects of the present invention, is specified by the schematic diagram of FIG. 4 and the physical parameters set forth in the Tables of FIGS. 6 and 7. In particular, each stationary planar mirror the illustrative embodiment is mounted at a particular tilt angle $t_i$ measured from the plane of the optical bench, and at a particular twist angle $\tau_i$ measured from the transverse axis of the fourth stationary mirror 34D, as shown in FIG. 4. The tilt and twist angles required to properly mount each of the six stationary planar mirrors about the four rotatable mirrors are set forth in Table of FIG. 6. Notably, in the illustrative embodiment, it is assumed that the shaft of the electric motor, and thus the axis 43, is perpendicularly mounted with respect to the plane of the optical bench upon which all of the stationary planar mirrors are mounted. The distance ($R_i$) measured between the edge of each rotatable mirror, when in the position shown in FIG. 4, and the center of each stationary planar mirror is defined in FIG. 4 and is set forth in the Table of FIG. 6. The angular deflection of the laser beam across each stationary planar mirror is defined by angle $\alpha_i$ and determines the width of the stationary mirror at its central height dimension. Also, the angle B which is formed between the horizontal reference line 46 and each scan line across stationary planar mirror is defined in FIG. 4 and set forth in the Table of FIG. 6. The angles at which rotatable planar mirrors are mounted with respect to the shaft of the electrical motor (i.e., the first axis) are defined in FIG. 5. In the illustrative embodiment, these acute angles have been selected so that the scan lines in each group of scan lines are substantially equidistant from each other at any distance from the window of the bar code symbol unit.

In the illustrative embodiment, light focusing element 35 is realized as a concave mirror stationarily mounted with respect to the optical bench 27, and is disposed at a height above and immediately adjacent to the fourth stationary planar mirror 34D. In the illustrative embodiment, the laser light detector 36 is realized as a silicon photo-diode detector, also fixedly mounted with respect to the optical bench. Preferably, the photo-diode detector is positioned at the focal length of the concave mirror 35 which, as shown, is above the array of rotatable planar mirrors. It is understood, however, that other types of optical elements can be used to realized light focusing element 35. For example, one could use a Fresnel lens. In such an alternative embodiment, however, it would be desirable to place the photo-diode detector at the focal length of this optical device, which would be behind this light focusing element.

The various electronic and electrical components for the bar code symbol reading unit are mounted on various printed circuit (PC) boards 47, 48, 49, and 50 mounted in the compact housing. Such circuitry includes the signal processor which processes the electrical signal produced by the photo-diode detector 36 in order to decode the scanned bar code signal. Similarly, the various electronic and electrical components used to realize system computer (i.e., a programmed microprocessor, EPROM for program storage, RAM for data storage, etc.,) 9, the power supply circuitry 10, and the container detection unit 4 are also mounted on one or more PC boards. It is preferred, however, that these PC boards are mounted within the machine housing in a conventional manner.

Having described the structure and function of the bar code symbol reading unit, it is appropriate to now describe the operation of the machine during the collection of a recyclable container having an arbitrary surface upon which a valid bar code symbol is printed.

Figure 3:
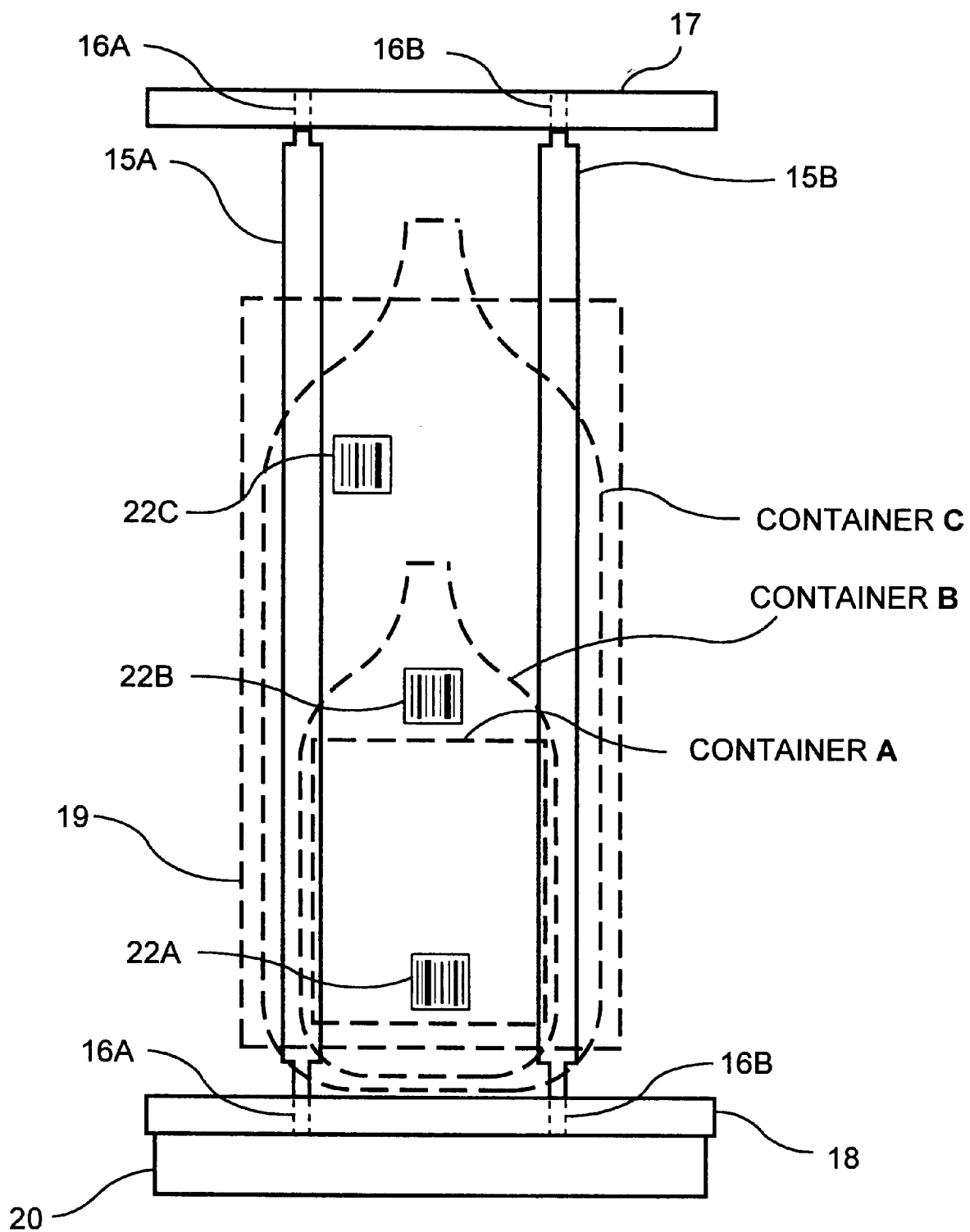
FIG. 3 is a planar view of the container support platform within the machine of the present invention, taken along line 3—3 of FIG. 1.
Figure 14:
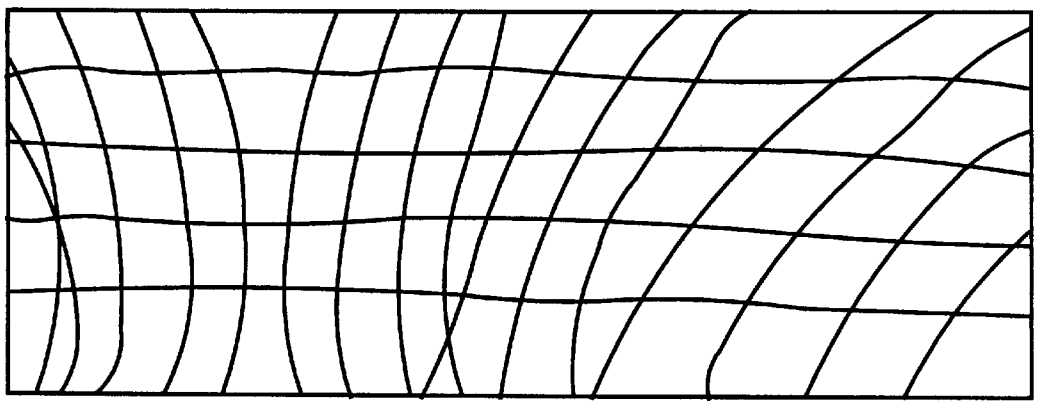
FIG. 14 is a graphical representation illustrating the manner in which the three-dimensional laser scanning pattern hereof is projected onto a 24 oz. metal soda can having a third arbitrary surface geometry.
Figure 13:
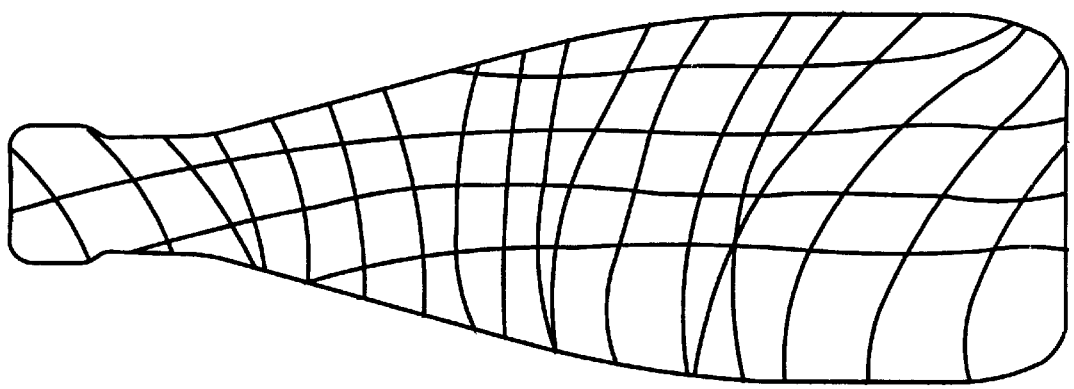
FIG. 13 is a graphical representation illustrating the manner in which the three-dimensional laser scanning pattern hereof is projected onto a 12 oz. glass bottle having a second arbitrary surface geometry and a bar code symbol printed thereon.
Figure 12:
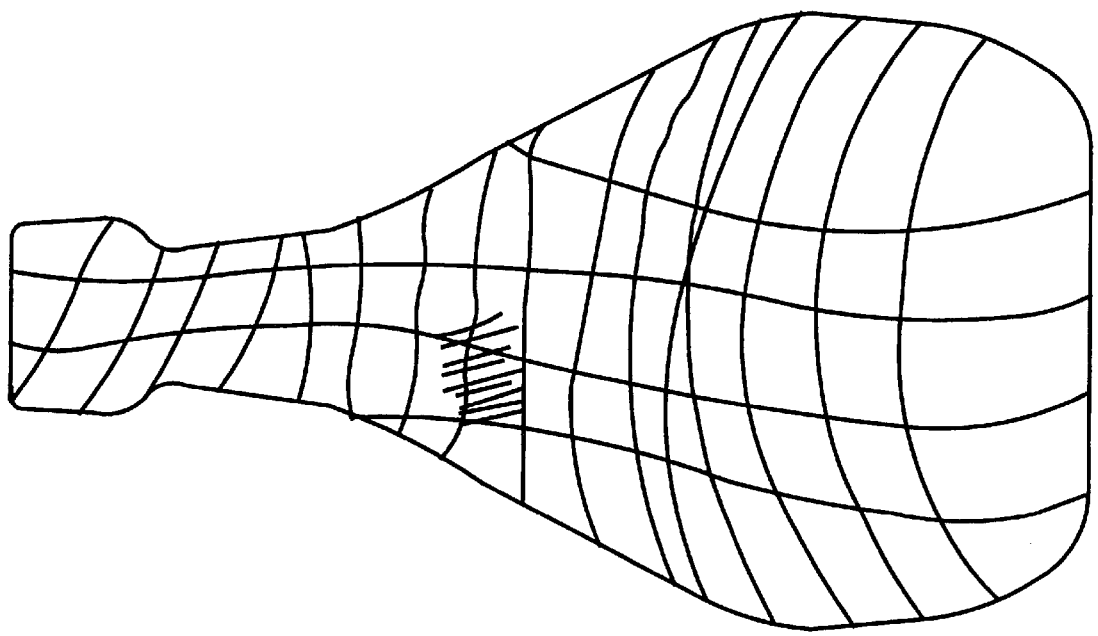
FIG. 12 is a graphical representation illustrating the manner in which the three-dimensional laser scanning pattern hereof is projected onto a 10 oz. glass bottle having a first arbitrary surface geometry and a bar code symbol printed thereon.

When a user (i.e., consumer) desires to return a recyclable container for payment of its prepaid deposit, the user opens housing door 14 and inserts container through opening 13 in the machine housing. This operation results in the container automatically becoming positioned upon the container support platform, as shown in FIGS. 2 and 3. With the container in this position, infrared light emitted from the container detection unit 4 is reflected from the surface of the container and is detected by its infrared transistor, causing a first control activation signal $A_1$ to be produced and provided to the system controller. Upon receipt of the first control activation signal $A_1$, the system computer simultaneously produces and provides a second control activation signal $A_2$ to the bar code symbol reading unit, and a third control activation signal $A_3$ to the drive circuitry associated with the electric motor 20 about which rotatable mirrors 32A, 32B, 32C, and 32D are mounted. This causes electrical motor 20 to drive container support spindles 15A and 15B and rotate the container about its longitudinal axis. At the same time, laser diode 30 produces a laser beam 51 and electrical motor 31 rotates planar mirrors 32A, 32B, 32C, and 32D at a very high angular velocity, e.g., in excess of about 3,800 rpm. The laser beam is then swept and projected through window 26 in order to produce a three-dimensional laser scanning pattern. The actual geometry of the three-dimensional laser scanning pattern (which is projected upon the arbitrary surface of the rotating recyclable container) depends upon two factors, namely: (i) the geometry of the laser scanning pattern produced by the bar code symbol reading unit and (ii) the surface geometry of the container being scanned. Resulting laser scanning patterns for three different types of containers are graphically represented in FIG. 12, 13, and 14. The process by which such laser scanning patterns are produced occurs very rapidly in a manner described below.

The laser beam produced from the laser diode 30 is reflected off routing mirrors 38 and 39, passes through aperture 40 formed in concave mirror 35, and is directed onto rotating planar mirrors 32A, 32B, 32C, and 32D, causing the laser beam to be repeatedly swept across the first, second, third, fourth, fifth, and sixth stationary planar mirrors 34A, 34B, 34C, 34D, 34E, and 34F. This causes six groups of four scan lines to be produced, as schematically illustrated in FIG. 4. These groups of plural scan lines are projected out through scanning window 26 and form within region 19, a three-dimensional laser scanning pattern which is projected upon the arbitrary surface of the container bearing the bar code symbol. In reference plane 52 parallel to and positioned about 10 inches from the window of the bar code symbol reading unit and about 3.25 inches above the plane within which spindles 15A and 15B are rotated, there is formed the two-dimensional scanning pattern graphically represented in FIG. 11A. In the reference plane 53 parallel to and positioned about 12 inches from the window of the bar code symbol reading unit and about 1.25 inches above the plane within which spindles 15A and 15B are rotated, there is formed the two-dimensional scanning pattern graphically represented in FIG. 11. Also, in the reference plane 54 parallel to and positioned about 8 inches from the window of the bar code symbol reading unit and about 5.25 inches above the plane within which spindles 15A and 15B are rotated, there is formed the two-dimensional scanning pattern graphically represented in FIG. 11B. Notably, the scan lines projected within these reference planes have a particular relationship in order to ensure that the rotating bar code symbol can be properly scanned in substantially semi-cylindrical scanning region 19, in a manner independent of the surface upon which the bar code symbol may be printed.

Figure 11A:
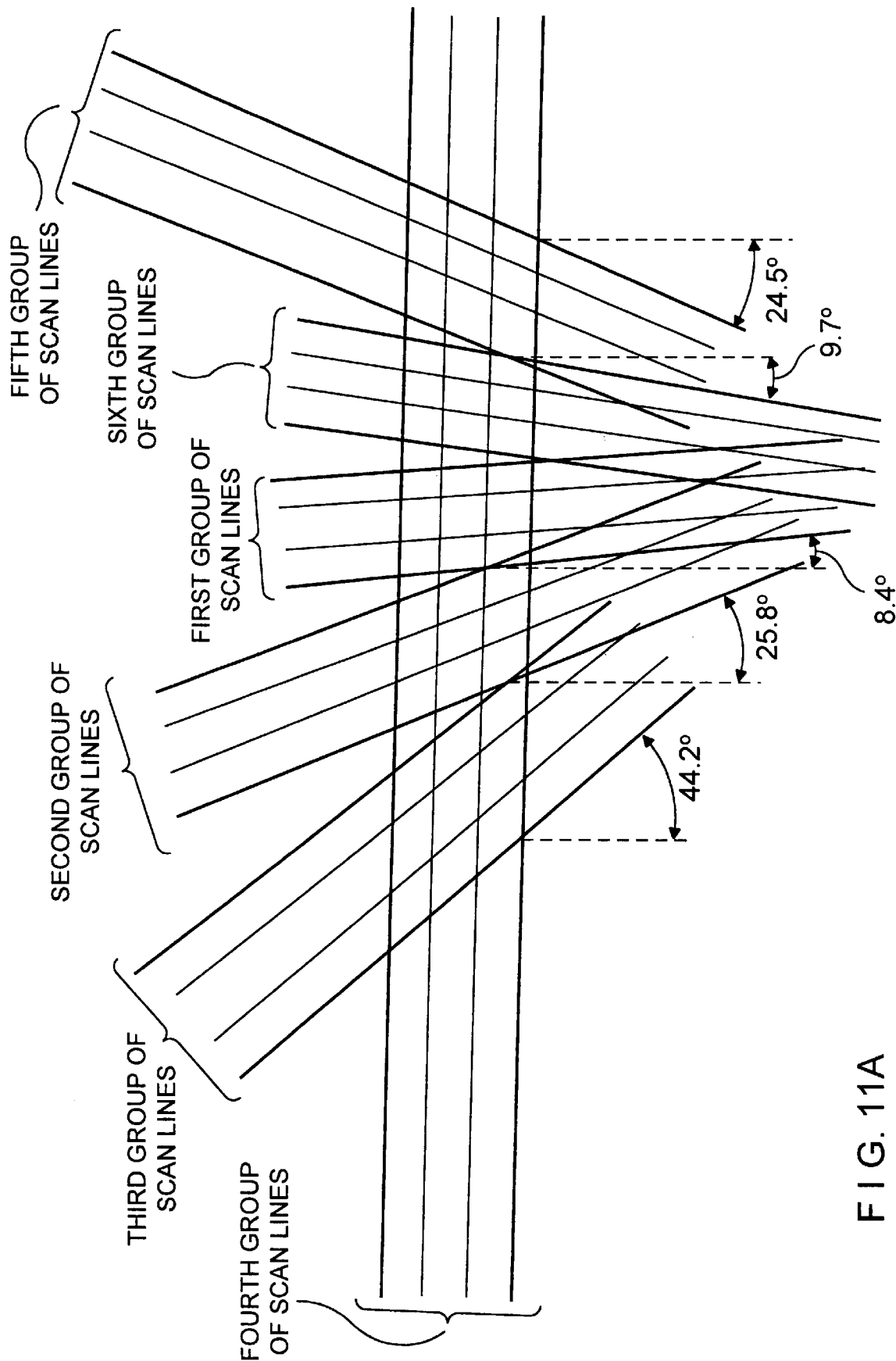
FIG. 11A is a graphical representation of a planar cross-section of the laser scanning pattern of the present invention, taken at about ten inches from the window of the bar code symbol reading unit and about 3.25 inches from the plane formed by the support spindle axes.
Figure 11B:
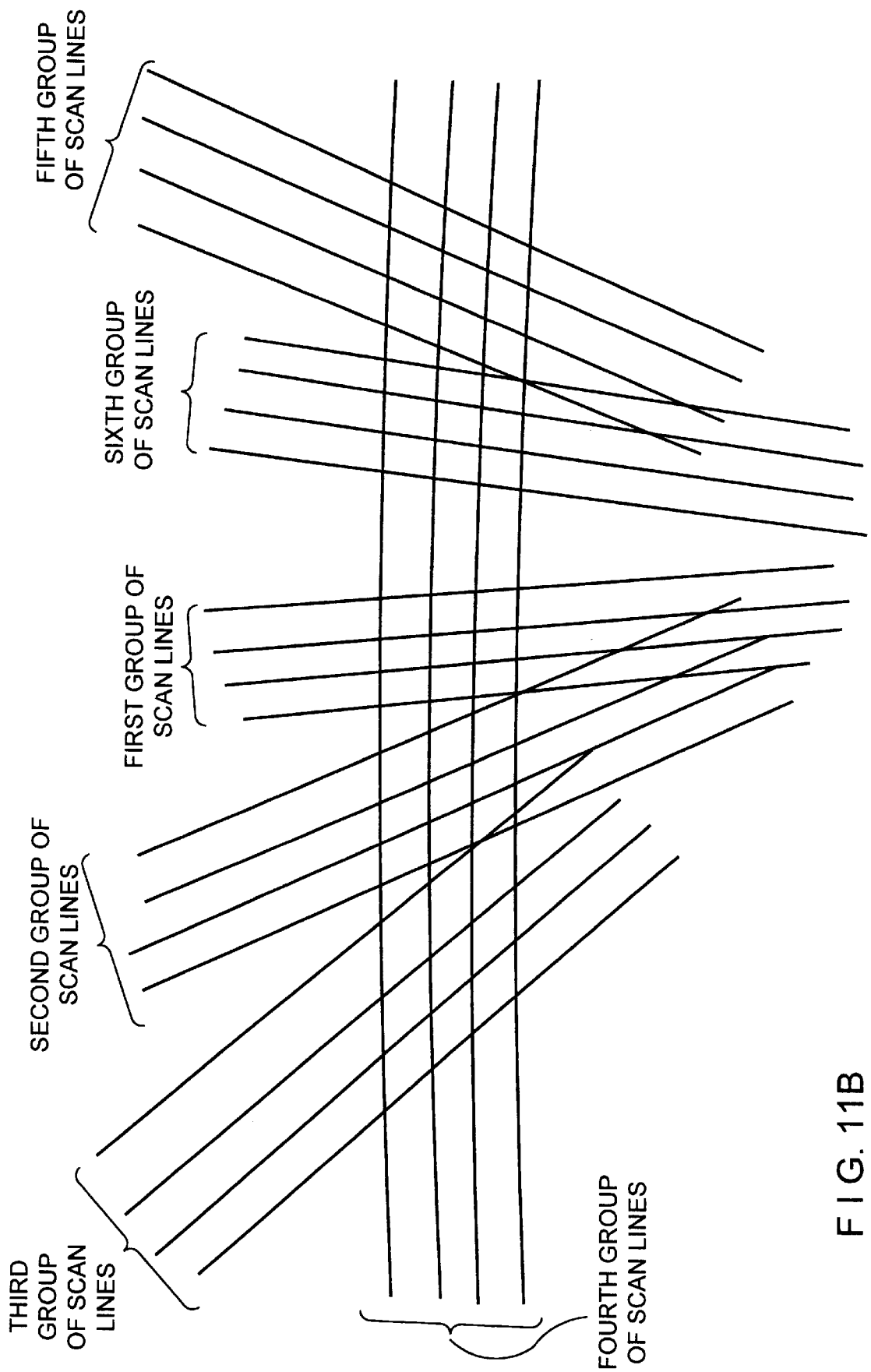
FIG. 11B is a graphical representation of a planar cross-section of the laser scanning pattern of the present invention, taken at about eight inches from the window of the bar code symbol reading unit and about 5.25 inches from the plane formed by the support spindle axes.
Figure 11C:
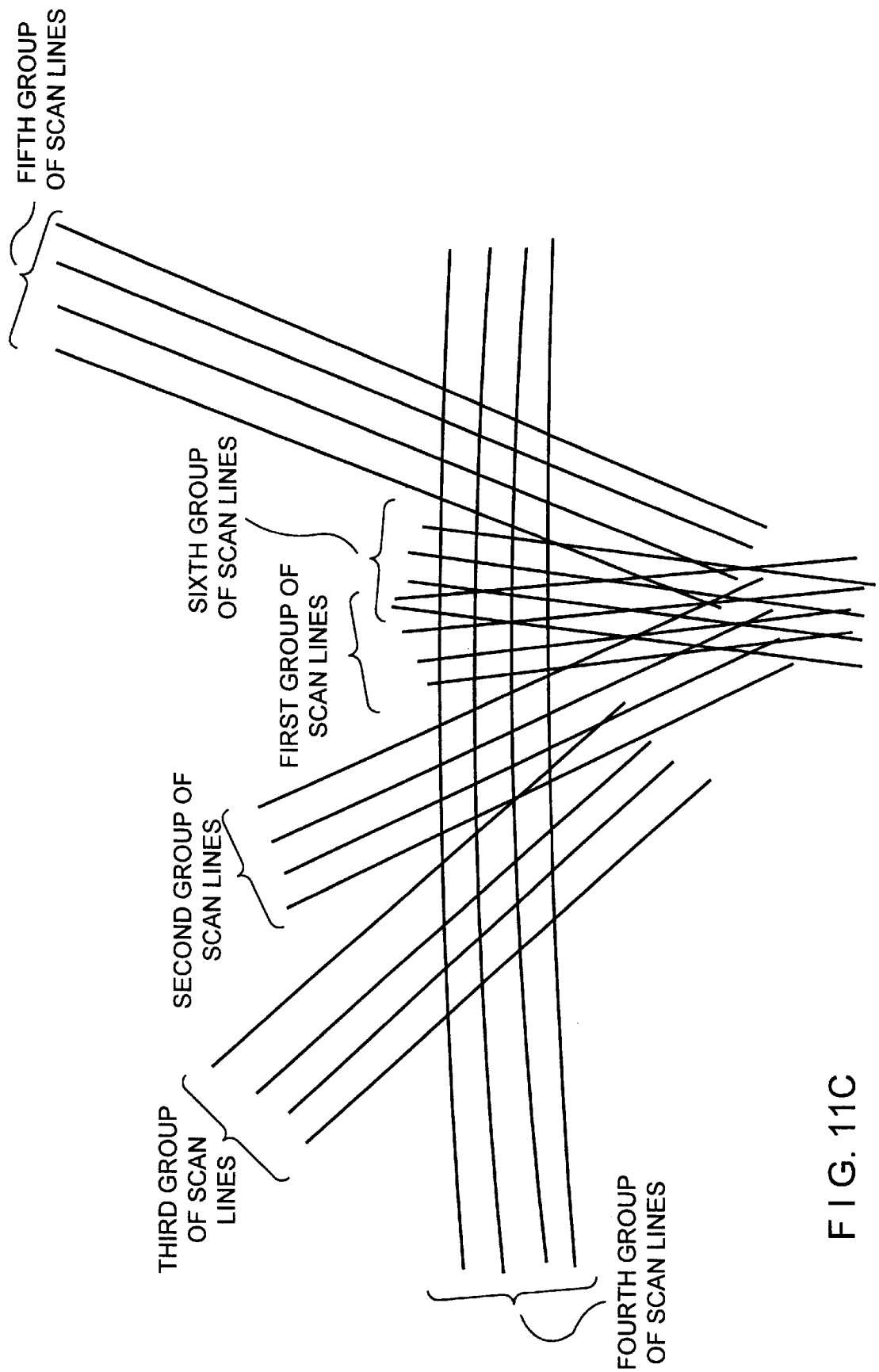
FIG. 11C is a graphical representation of a planar cross-section of the laser scanning pattern of the present invention, taken at about twelve inches from the window of the bar code symbol reading unit and about 1.25 inches from the plane formed by the support spindle axes.

As shown in FIGS. 11A, 11B, and 11C, each scan line in the first group of scan lines is substantially parallel to each other scan line in the first group of scan lines. Each scan line in the second group of scan lines is substantially parallel to each other scan line in the second group of scan lines. Each scan line in the third group of scan lines is substantially parallel to each other scan line in the third group of scan lines. Each scan line in the fourth group of scan lines is substantially parallel to each other scan line in the fourth group of scan lines. Each scan line in the fifth group of scan lines is substantially parallel to each other scan line in the fifth group of scan lines. Also, the fourth group of scan lines extends substantially parallel to the pair of rotatable container support shafts 15A, 15B in the substantially semi-cylindrical scanning region 19 above the predetermined container support region. As a result of the geometrical relationships among the groups of scan lines, the second, third, fifth, and sixth groups of scan lines are each disposed at an acute angle with respect to the first group of scan lines in the substantially semi-cylindrical scanning region 19.

As the bar code symbol on the rotating container is scanned by swept laser beam, at least a portion of the laser light reflected from the scanned bar code symbol is directed through the window, and is reflected off the six stationary mirrors towards the four rotating mirrors. This laser light is then reflected from these four rotating mirrors towards concave mirror 35, which focuses the laser light onto the photo-diode detector 36. In response to the intensity of the detected laser light, the photo-diode detector produces an electrical signal indicative of the detected laser light intensity. Then the signal processing circuitry in the compact housing processes the electrical signal so as to decode the scanned bar code symbol and produce data representative of the decoded bar symbol and produce data representative of the decoded bar code symbol If the decoded bar code signal is a valid bar code symbol, then the container is compacted and collected under the control of the system controller. Thereafter, the system computer directs deposit dispensing unit 8 to dispense the appropriate coin deposit (or voucher) to the user returning the recyclable container. If the decoded bar code symbol is not a valid bar code symbol, indicating that the container cannot be collected for a deposit refund, the system computer displays an appropriate message to the user interface unit 7, which the consumer can easily discern. If after a predetermined time period, the bar code symbol cannot be read by the bar code symbol reading unit, then the system computer directs the user interface unit to display such a message to the user.

While the illustrative embodiment of the present invention will be useful in many reverse vending applications, various modifications to the present invention will readily occur to persons with ordinary skill in the art. All such modifications and variations are deemed to be within the scope and spirit of the present invention as defined by the appended claims to invention.

What is claimed is:

1. A bar code symbol reading system for reading bar code symbols disposed on containers, such as cans and bottles, and having various capacity, an arbitrary surface upon which at least one said bar code symbol is printed, and a longitudinal axis about which said container is rapidly rotated while said bar code symbol is being read by system, said bar code symbol reading system comprising:

a compact housing having a light transmission window through which laser light can pass;

an optical bench disposed in said compact housing and having a central longitudinal plane;

a scan data producing means, disposed above said compact housing, for producing a laser beam and sweeping and projecting said laser beam through said light transmission window so as to form a three-dimensional laser scanning pattern within a substantially semi-cylindrical container scanning region disposed above said light transmission window so that as said container is rotated about its longitudinal axis, said laser beam is repeatedly scanned across the bar code symbol on said rotating container and at least a portion of the laser light reflected from said scanned bar code symbol is focused and the intensity of the focused light is detected within said compact housing so as to produce an electrical signal indicative of said detected light intensity; and signal processing means, disposed in said compact housing, for processing said electrical signal so as to decode said scanned bar code symbol and produce data representative of the decoded bar code symbol.

2. The bar code symbol reading system of claim 1, wherein said scan data producing means comprises:

activatable laser beam producing means fixedly mounted with respect to said optical bench, for producing, when activated, said laser beam;

laser beam sweeping means fixedly mounted with respect to said optical bench, for receipt of said laser beam and being arranged for repeatedly sweeping said laser beam about a first axis in plural paths, said first axis intersecting the longitudinal central plane of said optical bench;

an array of at least first, second, third, fourth, and fifth stationary reflective surfaces fixedly mounted with respect to said optical bench and disposed adjacent said beam sweeping means for receipt of said repeatedly swept laser beam, said first, second, third, fourth, and fifth stationary reflective surfaces being generally disposed under said window, said fourth stationary reflective surface having a transverse axis extending substantially perpendicularly to said central longitudinal plane, said first, second, and third stationary reflective surfaces being disposed on a first side of said central longitudinal plane and said fifth and sixth stationary reflective surfaces being disposed on a second side of said central longitudinal plane;

light focusing means fixedly mounted with respect to said optical bench, and having a transverse axis extending substantially perpendicularly to said central longitudinal plane;

light detection means fixedly mounted with respect to said optical bench, said light detection means being arranged to receive laser light from said light focusing means and for producing said electrical signal indicative of said detected intensity; and control means for controlling the operation of said activatable laser beam producing means, said laser beam sweeping means, said light detection means, and signal processing means so that said laser beam producing means produces said laser beam and said laser beam sweeping means repeatedly sweeps said laser beam about said first axis, and across said first, second, third, fourth, fifth, and sixth stationary reflective surfaces, thereby producing at least first, second, third, fourth, fifth, and sixth groups of plural scan lines, respectively, which are projected out through said light transmission window and produce said three-dimensional laser scanning pattern within which the bar code symbol on the arbitrary surface of said rotating container is scanned, whereby each scan line in said first group of scan lines is substantially parallel to each other scan line in said first group of scan lines, each scan line in said second group of scan lines is substantially parallel to each other scan line in said second group of scan lines, each scan line in said third group of scan lines is substantially parallel to each other scan line in said third group of scan lines, and each scan line in said fourth group of scan lines is substantially parallel to each other scan line in said fourth group of scan lines, each scan line in said fifth group of scan lines is substantially parallel to each other scan line in said fifth group of scan lines, and said fourth group of scan lines extending substantially parallel to the longitudinal axis of said rotating container, and said second, third, fifth, and sixth groups of scan lines each being disposed at an acute angle with respect to said first group of scan lines in said substantially semi-cylindrical container scanning.

3. The bar code symbol reading system of claim 2, wherein said laser beam sweeping means comprises an electric motor having shaft rotatable about said first axis, and a plurality of rotatable reflective surfaces fixedly mounted with respect to said rotatable shaft, each said rotatable reflective surface being substantially planar, disposed at a different acute angle with respect to said first axis, and rotating about said first axis when said electric motor is activated.

4. The bar code symbol reading system of claim 3, wherein said plurality of rotatable reflective surfaces comprises first, second, third, and fourth substantially planar mirrors, each being disposed at a different acute angle with respect to said first axis, and rotating about said first axis when said electric motor is activated.

5. The bar code symbol reading system of claim 4, wherein said different acute angles at which said rotating reflective surfaces are mounted with respect to said first axis are selected so that the scan lines in each said group of scan lines are substantially equidistant from each other at any distance from said window.

6. The bar code symbol reading system of claim 2, wherein said laser beam producing means comprises a laser diode fixedly mounted with respect to said optical bench, and wherein said first, second, third, fourth, fifth, and sixth stationary reflective surfaces comprise first, second, third, fourth, fifth, and sixth planar mirrors, respectively, each being fixedly mounted with respect to said optical bench.

7. The bar code symbol reading system of claim 6, wherein light focusing means comprises a focusing mirror.

* * * * *